United States Patent
Haevescher et al.

(10) Patent No.: US 12,036,865 B2
(45) Date of Patent: Jul. 16, 2024

(54) ROTARY CONTROL DEVICE

(71) Applicant: ZF Friedrichshafen AG, Friedrichshafen (DE)

(72) Inventors: Rainer Haevescher, Stemwede (DE); Artur Neumann, Kalletal (DE)

(73) Assignee: SIGNATA GmbH, Diepholz (DE)

( * ) Notice: Subject to any disclaimer, the term of this patent is extended or adjusted under 35 U.S.C. 154(b) by 0 days.

(21) Appl. No.: 16/624,247

(22) PCT Filed: May 23, 2018

(86) PCT No.: PCT/EP2018/063550
§ 371 (c)(1),
(2) Date: Dec. 18, 2019

(87) PCT Pub. No.: WO2018/233973
PCT Pub. Date: Dec. 27, 2018

(65) Prior Publication Data
US 2021/0146779 A1    May 20, 2021

(30) Foreign Application Priority Data
Jun. 21, 2017   (DE) .................... 10 2017 210 442.2

(51) Int. Cl.
*B60K 37/06* (2006.01)
*B60K 35/00* (2006.01)
(Continued)

(52) U.S. Cl.
CPC .............. *B60K 35/10* (2024.01); *B60K 35/00* (2013.01); *G05G 1/015* (2013.01); *G05G 1/04* (2013.01);
(Continued)

(58) Field of Classification Search
CPC .. B60K 37/06; B60K 35/00; B60K 2370/152; B60K 2370/126; G05G 1/015;
(Continued)

(56) References Cited

U.S. PATENT DOCUMENTS 6,128,006 A  *  10/2000  Rosenberg ............. G01C 21/36
345/161
2009/0000407 A1   1/2009  Meyer et al.
(Continued)

FOREIGN PATENT DOCUMENTS

DE   10 2017 210 442 A1   12/2018
WO   WO 2006/021198 A1    3/2006
WO   WO 2018/233973 A1   12/2018

OTHER PUBLICATIONS

International Search Report from European Patent Office ISA in PCT/EP2018/063550 mailed on Sep. 19, 2018 (4 pages).
Written Opinion of the International Searching Authority in PCT/EP2018/063550 mailed Sep. 19, 2018 (6 pages).

*Primary Examiner* — Christopher E Leiby
(74) *Attorney, Agent, or Firm* — Crowell & Moring LLP

(57) ABSTRACT

The invention relates to a rotary control device (1) for a vehicle comprising a user interface surface (3), in particular a knob, that is embodied to rotate with respect to a housing (5) of the device (1) around a rotational axis (7) of the device (1), further comprising a sensor unit (9) for monitoring the orientation and/or rotational movement of the user interface surface (3) with respect to the housing (5), a processing unit (11), and a communications interface (13) for transmitting control signals (Ts) according to an output (Op) from the processing unit (11), said output (Op) being generated by the processing unit (11) on the basis of sensor data (Ds) from the sensor unit (9).

16 Claims, 2 Drawing Sheets

Figure 1:
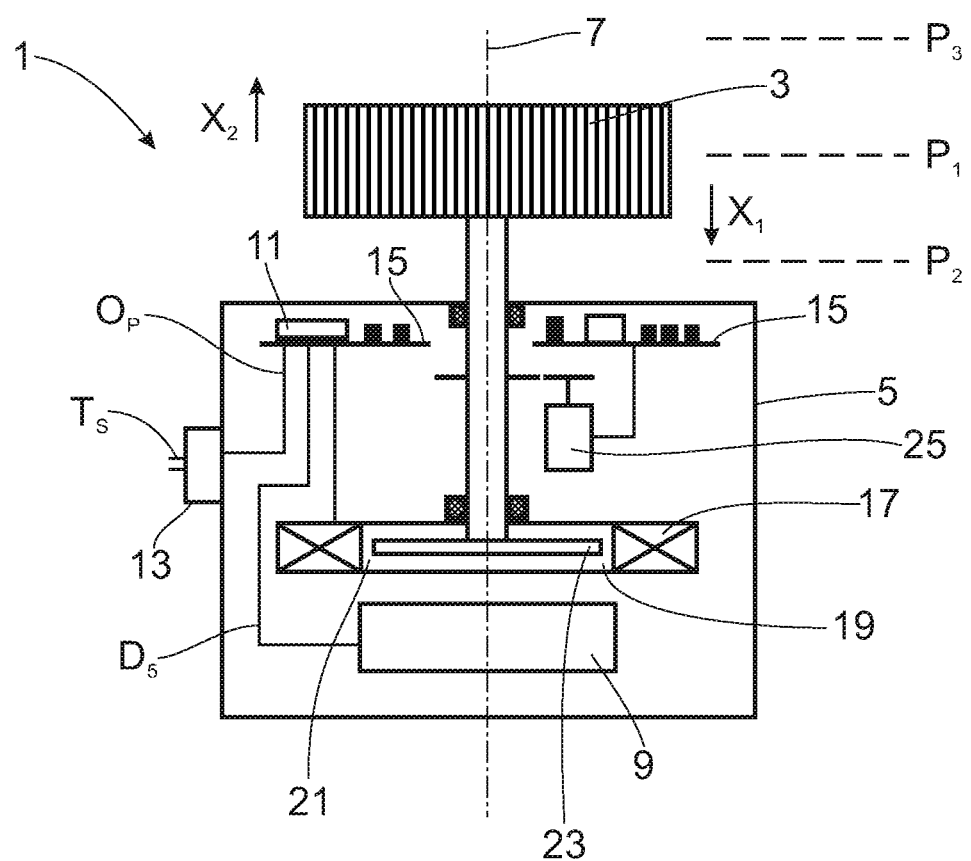

(51) Int. Cl.
*B60K 35/10* (2024.01)
*G05G 1/015* (2008.04)
*G05G 1/04* (2006.01)
*G05G 5/03* (2008.04)
*G05G 5/04* (2006.01)
*G05G 5/05* (2006.01)
*G06F 3/01* (2006.01)
*G06F 3/038* (2013.01)
*G06F 3/0487* (2013.01)
*B60K 35/22* (2024.01)

(52) U.S. Cl.
CPC ............... *G05G 5/03* (2013.01); *G05G 5/04* (2013.01); *G05G 5/05* (2013.01); *G06F 3/016* (2013.01); *G06F 3/0383* (2013.01); *G06F 3/0487* (2013.01); *B60K 35/22* (2024.01); *B60K 2360/126* (2024.01); *G05G 2505/00* (2013.01)

(58) Field of Classification Search
CPC .. G05G 1/04; G05G 1/03; G05G 1/05; G05G 2505/00; G06F 3/016; G06F 3/0383; G06F 3/0487
See application file for complete search history.

(56) References Cited

U.S. PATENT DOCUMENTS

| | | |
|---|---|---|
| 2011/0181405 A1 | 7/2011 | Periquet et al. |
| 2015/0285351 A1 | 10/2015 | Rake et al. |
| 2016/0216763 A1 | 7/2016 | Vanhelle et al. |
| 2016/0224114 A1* | 8/2016 | Vanhelle ............... B60K 37/06 |
| 2016/0378131 A1 | 12/2016 | Battlogg |
| 2018/0279061 A1* | 9/2018 | Walraevens ......... H04R 25/606 |
| 2020/0043305 A1* | 2/2020 | Wakuda ............... F16D 57/002 |

* cited by examiner

ROTARY CONTROL DEVICE

The invention relates to a rotary control device comprising a user interface surface that is embodied to rotate with respect to a housing of the device around a rotational axis of the device, further comprising a sensor unit for monitoring the orientation and/or rotational movement of the user interface surface with respect to the housing, a processing unit, and a communications interface for transmitting control signals according to an output from the processing unit, said output being generated by the processing unit on the basis of sensor data from the sensor unit, wherein the rotary control device further comprises a magnetorheological actuator, wherein the magnetorheological actuator comprises a rotational element that is mechanically connected to the user interface surface and serves to interact with a magnetorheological fluid of the magnetorheological actuator, and wherein the magnetorheological actuator comprises an assembly for generating and/or manipulating properties of a magnetic field acting on the magnetorheological fluid such that the magnetorheological actuator serves to modulate torque transmission between the user interface surface and the housing.

Haptic interfaces for control are known for example from the European patent publication EP2065614A1, wherein an assembly for manipulating properties of a magnetic field is disclosed for the purpose of modulating the torque transfer between a rotational element and a housing of the haptic interface.

The object of the invention is to introduce an improved rotary control device.

The object of the invention is achieved by a rotary control device defined by the subject matter of the independent claim. The dependent claims and the description define advantageous embodiments of the system.

The object is therefore achieved by a rotary control device comprising a user interface surface that is embodied to rotate with respect to a housing of the device around a rotational axis of the device, further comprising a sensor unit for monitoring the orientation and/or rotational movement of the user interface surface with respect to the housing, a processing unit, and a communications interface for transmitting control signals according to an output from the processing unit, said output being generated by the processing unit on the basis of sensor data from the sensor unit, wherein the rotary control device further comprises a magnetorheological actuator, wherein the magnetorheological actuator comprises a rotational element that is mechanically connected to the user interface surface and serves to interact with a magnetorheological fluid of the magnetorheological actuator, and wherein the magnetorheological actuator comprises an assembly for generating and/or manipulating properties of a magnetic field acting on the magnetorheological fluid such that the magnetorheological actuator serves to modulate torque transmission between the user interface surface and the housing, wherein the rotary control device further comprises a servo actuator that is embodied to apply torque to the user interface surface in accordance with governing signals output by the processing unit of the device.

A position of the user interface surface in the sense of the invention refers to the placement of the user interface surface within a plane spatially displaced from the housing of the device by a specified distance. An orientation of the user interface surface in the sense of the invention refers to a rotational displacement of the user interface surface around the rotational axis of the device by a specific degree of rotation with respect to an initial setting of the user interface surface with reference to the housing.

The magneto-rheological fluid defines the behavior of the rotary control device. To this end, a voltage supplied to the assembly is varied to induce a surrounding magnetic field that changes the viscosity of the fluid. Depending on the magnetic field, in particular depending on properties of the magnetic field such as intensity and/or direction, the MRF can vary between liquid and solid state, which can be controlled very accurately. In a fluid state, MRF transfers little to no torque between the rotational element and the housing. However, as the viscosity increases and the fluid approaches a solid state, the sheer forces within the fluid and between the fluid and the rotational element as well as between the fluid and the housing, or a component attached fixedly to the housing, increases. This leads to an increasing torque transfer between the user interface surface and the housing.

The device can be used to select an operation mode of the vehicle, which is for example a forwards drive operation mode wherein torque is transferred from a drive unit of the vehicle in order to propel the vehicle in a forwards direction, a reverse drive operation mode wherein torque is transferred from a drive unit of the vehicle in order to propel the vehicle in a reverse direction, a neutral operation mode wherein no torque is transferred from a drive unit of the vehicle, a park operation mode where a torque transmission unit attached to the drive unit of the vehicle is mechanically blocked, or another operation mode.

When a position and/or orientation of the user interface surface remains constant in the absence of a force applied the device from an external source, then this position and/or orientation of the user interface surface can be referred to as a stable position. On the other hand, when the user interface surface does not remain in a certain position or orientation, because for example a mechanism of the device applies a force internally, then this position and/or orientation can be referred to as being non-stable.

A safety relevant function of the vehicle in the sense of the invention can be for example the selection of an operation mode of the vehicle, steering, accelerating or braking the vehicle. A non-safety function of the vehicle can be for example navigation or control of a multimedia interface.

A communications pathway in the sense of the invention can be for example a hardline for transferring data such as a databus and/or a wireless data transmission channel. In many modern street vehicles, a CAN-databus is a preferred type of communications pathway.

The user interface surface, or knob, in the sense of the invention can comprise the outer surface of a ring shaped and/or half shell shaped structure, which is accessible to an operator, i.e. user, of the vehicle. The user interface surface can further comprise a construction underlying the outer surface of the user interface surface.

In an embodiment of the rotary control device the MRF actuator is embodied to generate and/or manipulate the properties of the magnetic field according to haptic-feedback signals received by the device via the communications interface.

In an embodiment of the rotary control device the processing unit is embodied to output governing signals for governing the assembly for generating and/or manipulating the properties of the magnetic field on the basis of sensor data from the sensor unit.

In an embodiment of the rotary control device the servo actuator is embodied to apply torque to the user interface surface such that the orientation of the user interface surface with respect to the housing is returned to a predetermined orientation when the orientation of the user interface surface is varied by a predetermined amount in at least one rotational direction from the predetermined orientation.

In an embodiment of the rotary control device, the servo actuator serves to apply torque to the user interface surface such that a braking force progression employed by the MRF actuator along a first defined portion of a rotational path of the user interface surface is inverted i.e. mirrored and applied to the user interface surface by the servo actuator as a torque application force progression along a second defined portion of the rotational path. The haptic feedback provided by traditional rotary control devices can thereby be mimicked.

In an embodiment of the rotary control device the predetermined orientation is determined on the basis of sensor data from the sensor unit.

In an embodiment of the rotary control device the processing unit is embodied to output governing signals to the assembly causing the assembly to manipulate the magnetic field such that the torque transmission between the user interface surface and the housing is increased to a predetermined value to inhibit movement of the user interface surface with respect to the housing when the orientation of the user interface surface is varied by a predetermined amount in at least one rotational direction from a predetermined orientation.

In an embodiment of the rotary control device the torque transmission is increased progressively as the orientation of the user interface surface deviates from the predetermined position according to a predetermined braking force pathway progression, in particular an exponentially increasing braking force pathway progression.

In an embodiment of the rotary control device the sensor unit of the device further comprises a sensor for monitoring the torque applied to the user interface surface.

In an embodiment of the rotary control device the sensor unit of the device further monitors the acceleration of the rotational movement of the user interface surface with respect to the housing.

In an embodiment of the rotary control device the rotational element comprises a chamber containing the magnetorheological fluid, and in that a static element is provided, which is fixedly arranged with respect to the housing and arranged at least partially within the chamber, such that the torque transmission between inner surface of the chamber of the rotational element and the static element is dependent on the properties of a magnetic field.

In an embodiment of the rotary control device the rotational element is embodied to rotate within a chamber of the actuator containing the magnetorheological fluid, said chamber being fixedly arranged with respect to the housing, such that the torque transmission between the rotational element and an inner surface of the chamber is dependent on the properties of a magnetic field.

A System for a vehicle comprising such an embodiment of the rotary control device can further comprise a graphical user interface unit comprising a display and a processing unit, the system further comprising a communications pathway between the rotary control device and the graphical user interface unit.

Such a system can further be embodied such that the graphical user interface unit transmits haptic-feedback signals to the rotary control device via the communications pathway.

Such a system can further be embodied such that the rotary control device transmits control signals to the graphical user interface unit, and wherein the display of the graphical user interface unit displays a visual feedback according to the control signals received from the device.

Figure 2:
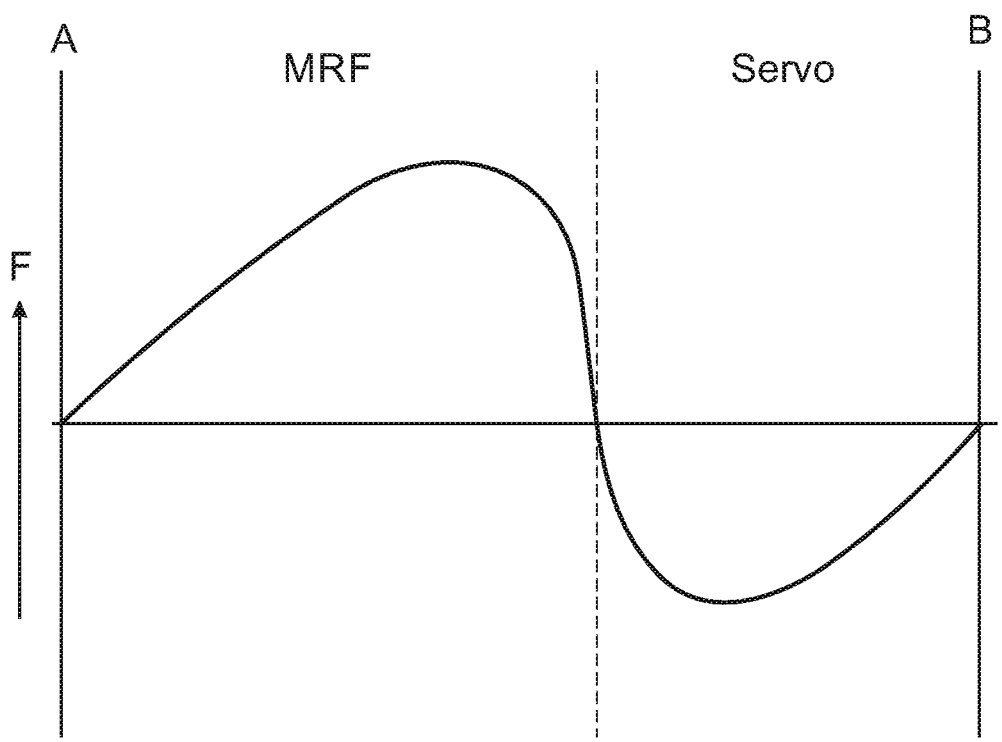

Certain embodiments of the invention will next be explained in detail with reference to the following figures. They show:

FIG. 1 a schematic diagram of an embodiment of the inventive rotary control device; and FIG. 2 a force progression diagram according to an embodiment of the inventive rotary control device.

FIG. 1 shows a schematic diagram of an embodiment of the inventive rotary control device 1 having a user interface surface 3, which can be moved and rotated by a user or operator of a vehicle. The user interface surface can be rotated around a rotational axis 7 of the device 1 to various orientations A1-. The user interface surface 3 can furthermore be moved by a user or operator of the vehicle between a first, second and third position P1, P2, P3.

The device 1 comprises a housing 5, which at least partially encloses a processing unit 11 mounted on a substrate 15, which is a printed circuit board. The processing unit 11 is connected to a communications interface 13. Via the communications interface 13 signals such as control signals Ts can be transmitted and received. The processing unit 11 is further connected to a sensor unit 9 which serves to monitor the rotational movement and/or orientation of the user interface surface with respect to the housing 5. The sensor unit 9 transmits sensor data Ds to the processing unit 11 and on the basis of this sensor data Ds, the processing unit 11 can generate control signals to transmit via the communications interface 13.

The device further comprises an assembly 17 for generating and manipulating a magnetic field in a chamber 19 of the housing 5. The chamber contains a magnetorheological fluid 21 also known as MRF. Positioned partially within the chamber is a rotational element 23. The rotational element 23 is mechanically connected to the user interface surface 3 and rotates with the rotation of the interface 3.

Corresponding to changes in properties of the magnetic field caused by the assembly 17, such as field strength and direction, the magnetorheological fluid 12 varies in viscosity so to speak. Therefore, in a corresponding way, the fluid transfers more or less torque between the user interface surface 3 and the housing 5 of the device 1. This is due to the changing sheer forces within the fluid and between the fluid and the chamber wall. Since the housing 5 of the device is generally fixedly mounted within the vehicle, the assembly can be considered to modulate a sort of braking force acting on the user interface surface 3. Such systems comprising MRF 21 in a chamber 19, rotational elements 23, and assemblies 17 for manipulating the magnetic field within the chamber 19 are often referred to as MRF-Actuators. The processing unit 11 is embodied to output governing signals for controlling the assembly 17. The assembly 17 can, for example, be driven by a circuit on the substrate 15 feeding the assembly 17 with a pulsed width modulated (PWM) current or voltage in accordance with the governing signals from the processing unit 11.

The device further comprises a servo actuator 25 which engages with the rotational element 23 and can therefore apply torque to the user interface surface 3.

FIG. 2 shows a braking force progression diagram according to an embodiment of the inventive rotary control device. The force progression is shown with respect to a rotational pathway of the user interface surface 3 between two orientations for making selections such that the processing unit generates control signals for the device to transmit.

In a first portion of the pathway (labeled MRF) a braking force is increase to a certain value as the user interface is rotated. The braking force is caused by the MRF actuator. In the second portion of the pathway, the braking force progression is inverted, or relatedly is subjected to a mathematical rotational transform and is applied to the user interface surface as a negative braking force (i.e. a propelling force). This force is employed by the servo actuator. It can be interpreted by an operator of the device 1 as an acceleration caused by passing a latching point in a mechanical, conventional, rotary device in order to arrive at a second orientation for making a selection.

REFERENCE CHARACTERS

1 Rotary control device
3 user interface surface
5 housing
7 rotational axis
9 sensor unit
11 processing unit
13 communications interface
15 substrate/PCB
17 assembly for generating/manipulating magnetic field
19 chamber
21 magnetorheological fluid
23 rotational element
25 servo actuator
X1 first direction
X2 second direction
P1 first position
P2 second position
P3 third position

The invention claimed is:

1. A rotary control device comprising:
a user interface surface configured to rotate with respect to a housing of the device around a rotational axis of the device;
a sensor unit configured to monitor at least one of an orientation or a rotational movement of the user interface surface with respect to the housing;
a processing unit configured to generate an output on a basis of sensor data from the sensor unit;
a communications interface configured to transmit control signals according to the output from the processing unit;
a magnetorheological actuator comprising:
a chamber containing magnetorheological fluid;
a rotational element that is mechanically connected to the user interface surface and comprising a member extending horizontally within the chamber such that the member contacts the magnetorheological fluid on a first surface of the member and a second surface of the member, wherein the first surface and second surface are substantially perpendicular to the axis of rotation; and
an assembly configured to at least one of generate or manipulate properties of a magnetic field acting on the magnetorheological fluid such that the magnetorheological actuator serves to modulate torque transmission between the user interface surface and the housing; and
a servo actuator that is separate from the magnetorheological actuator and that is_configured to apply torque to the user interface surface in accordance with governing signals output by the processing unit.

2. The rotary control device according to claim 1, wherein the magnetorheological actuator is configured to at least one of generate or manipulate the properties of the magnetic field according to haptic-feedback signals received by the device via the communications interface.

3. The rotary control device according to claim 1, wherein the processing unit is configured to output governing signals for governing the assembly to cause the assembly to at least one of generate or manipulate the properties of the magnetic field on the basis of the sensor data from the sensor unit.

4. The rotary control device according to claim 1, wherein the servo actuator is configured to apply torque to the user interface surface such that an orientation of the user interface surface with respect to the housing is returned to a predetermined orientation when the orientation of the user interface surface is varied by a predetermined amount in at least one rotational direction from the predetermined orientation.

5. The rotary control device according to claim 4, wherein the processing unit is configured to determine the predetermined orientation on a basis of the sensor data from the sensor unit.

6. The rotary control device according to claim 1, wherein the processing unit is configured to output the governing signals to cause the assembly to manipulate the magnetic field such that the torque transmission between the user interface surface and the housing is increased to a predetermined value to inhibit movement of the user interface surface with respect to the housing when an orientation of the user interface surface is varied by a predetermined amount in at least one rotational direction from a predetermined orientation.

7. The rotary control device according to claim 1, wherein the assembly is configured to increase the torque transmission progressively as an orientation of the user interface surface deviates from a predetermined position according to a predetermined braking force pathway progression.

8. The rotary control device according to claim 1, wherein the sensor unit further comprises a sensor for monitoring a torque applied to the user interface surface.

9. The rotary control device according to claim 1, wherein the sensor unit is configured to monitor an acceleration of the rotational movement of the user interface surface with respect to the housing.

10. The rotary control device according to claim 1, wherein the rotational element comprises a chamber containing the magnetorheological fluid,
wherein the rotary control device further comprises a static element fixedly arranged with respect to the housing and arranged at least partially within the chamber, such that the torque transmission between an inner surface of the chamber of the rotational element and the static element is dependent on the properties of the magnetic field.

11. The rotary control device according to claim 1, wherein the rotational element is configured to rotate within a chamber of the magnetorheological actuator containing the magnetorheological fluid, said chamber being fixedly arranged with respect to the housing, such that the torque transmission between the rotational element and an inner surface of the chamber is dependent on the properties of the magnetic field.

12. A system for a vehicle comprising:
the rotary control device according to claim 1;
a graphical user interface unit comprising a display and a processing unit; and
a communications pathway between the rotary control device and the graphical user interface unit.

13. The system according to claim 12 wherein the graphical user interface unit transmits haptic-feedback signals to the rotary control device via the communications pathway.

14. The system according to claim 12, wherein the rotary control device transmits control signals to the graphical user interface unit, and wherein the display of the graphical user interface unit displays a visual feedback according to the control signals received from the rotary control device.

15. The rotary control device according to claim 7, wherein the predetermined braking force pathway progression is an exponentially increasing braking force pathway progression.

16. The rotary control device according to claim 1, wherein
the magnetorheological actuator is configured to apply a braking torque opposed to a direction of the rotational movement of the user interface surface, and
wherein the servo actuator is configured to apply a propelling force torque in the direction of the rotational movement of the user interface surface.

* * * * *